(12) United States Patent
Binotto et al.

(10) Patent No.: US 10,121,096 B2
(45) Date of Patent: Nov. 6, 2018

(54) STEERING SEISMIC TEXTURE ANALYSIS ALGORITHMS USING EXPERT INPUT

(71) Applicant: International Business Machines Corporation, Armonk, NY (US)

(72) Inventors: Alecio Pedro Delazari Binotto, Rio de Janeiro (BR); Emilio Ashton Vital Brazil, Rio de Janeiro (BR); Renato Fontoura De Gusmao Cerqueira, Barra da Tijuca (BR); Rodrigo da Silva Ferreira, Nova Iguacu (BR); Michael Raghib Moreno, Rio de Janeiro (BR); Vagner Figueredo De Santana, Sao Paulo (BR); Viviane Torres Da Silva, Rio de Janeiro (BR)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/223,777

(22) Filed: Jul. 29, 2016

(65) Prior Publication Data

US 2018/0032839 A1 Feb. 1, 2018

(51) Int. Cl.
| | |
|---|---|
| *G06K 9/62* | (2006.01) |
| *G06K 9/00* | (2006.01) |
| *G06F 17/24* | (2006.01) |
| *G06F 17/28* | (2006.01) |
| *G06T 7/40* | (2017.01) |

(52) U.S. Cl.
CPC .......... *G06K 9/627* (2013.01); *G06F 17/241* (2013.01); *G06F 17/28* (2013.01); *G06K 9/00416* (2013.01); *G06T 7/401* (2013.01); *G06T 2207/20092* (2013.01); *G06T 2207/30181* (2013.01)

(58) Field of Classification Search
CPC .... G06K 9/627; G06K 9/00416; G06T 7/401; G06T 2207/30181; G06T 2207/20092; G06F 17/241; G06F 17/28
USPC ........................................................ 382/109
See application file for complete search history.

(56) References Cited

U.S. PATENT DOCUMENTS

| | | |
|---|---|---|
| 6,052,650 A | 4/2000 | Assa et al. |
| 6,226,596 B1 | 5/2001 | Gao |
| | (Continued) | |

FOREIGN PATENT DOCUMENTS

| | | | | |
|---|---|---|---|---|
| CN | 101482920 A | * | 7/2009 | ......... G06K 9/00416 |
| WO | 2012078217 A1 | | 6/2012 | |

OTHER PUBLICATIONS

SPE 35482, 3-D Seismic Texture Classification, R. Vinther and K. Mosegaard, Univ. of Copenhagen, 1.Abatzis, C. Andersen and O.V. Vejbaek, Geus, F. If, COWlconsult, AS and P.H. Nielsen, Ufiv. of Aarhus, Copyright 1996, Society of Petroleum Engineers, (pp. 57-63.).

(Continued)

*Primary Examiner* — Amandeep Saini
(74) *Attorney, Agent, or Firm* — Harrington & Smith; Louis J. Percello

(57) ABSTRACT

A method is provided, the method including: displaying an image on a display; detect a user input corresponding to one or more portions of the image; analyzing the user input to determine at least one feature vector corresponding to the user input; and determining a classification for the one or more portions of the image based at least on the at least one feature vector.

19 Claims, 14 Drawing Sheets

(56) References Cited

U.S. PATENT DOCUMENTS

| | | | |
|---|---|---|---|
| 6,438,493 | B1 | 8/2002 | West et al. |
| 8,983,141 | B2 | 3/2015 | Kumaran |
| 2011/0115787 | A1* | 5/2011 | Kadlec .................. G01V 1/345 345/419 |
| 2012/0054177 | A1 | 3/2012 | Wang et al. |
| 2012/0090834 | A1 | 4/2012 | Imhof et al. |
| 2014/0108016 | A1 | 4/2014 | Albrecht |
| 2014/0118350 | A1 | 5/2014 | Imhof et al. |

OTHER PUBLICATIONS

CT1.5, Seismic texture classification: A computer-aided approach to stratigraphic analysis Rikke Vinther*, Klaus Mosegaard, Keld Kierkegaard, University of Copenhagen; Ioannis Abatzis, Claus Andersen, Ole V. Vejbaek, Geological Survey of Denmark; Flemming If and Peder H. Nielsen, COWIconsult AS, Denmark, (pp. 153-155).

Eurographics Symposium on Sketch-Based Interfaces and Modeling (2012), L. B. Kara and K. Singh (Editors) Sketch Modeling of Seismic Horizons from Uncertainty, (2012), (10 pages).

Rebecca Latimer, Interpreter'S Corner, "Applications of texture attribute analysis to 3D seismic data", (Aug. 2006), (pp. 934-940).

Yenugu et al., "Seismic Texture Analysis for Reservoir Prediction and Characterization", (Sep. 2010), (pp. 1116-1121).

Wu et al., "Statistical Modeling of Texture Sketch", (2002), (pp. 240-254).

Branson et al., "Visual Recognition with Humans in the Loop", (14 pages).

Morten Bendiksen, "Rapid Modeling of Geology", University of Bergren Department of Informatics, (2013), (104 pages).

* cited by examiner

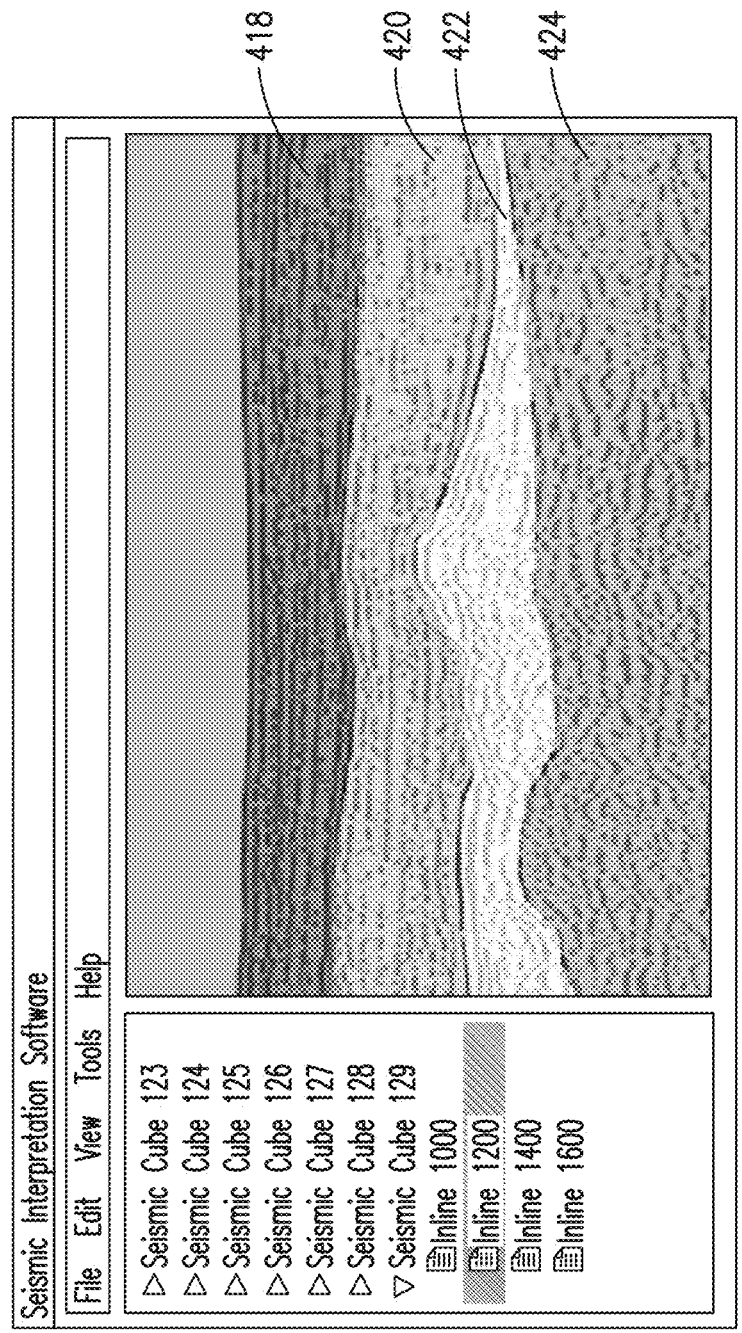

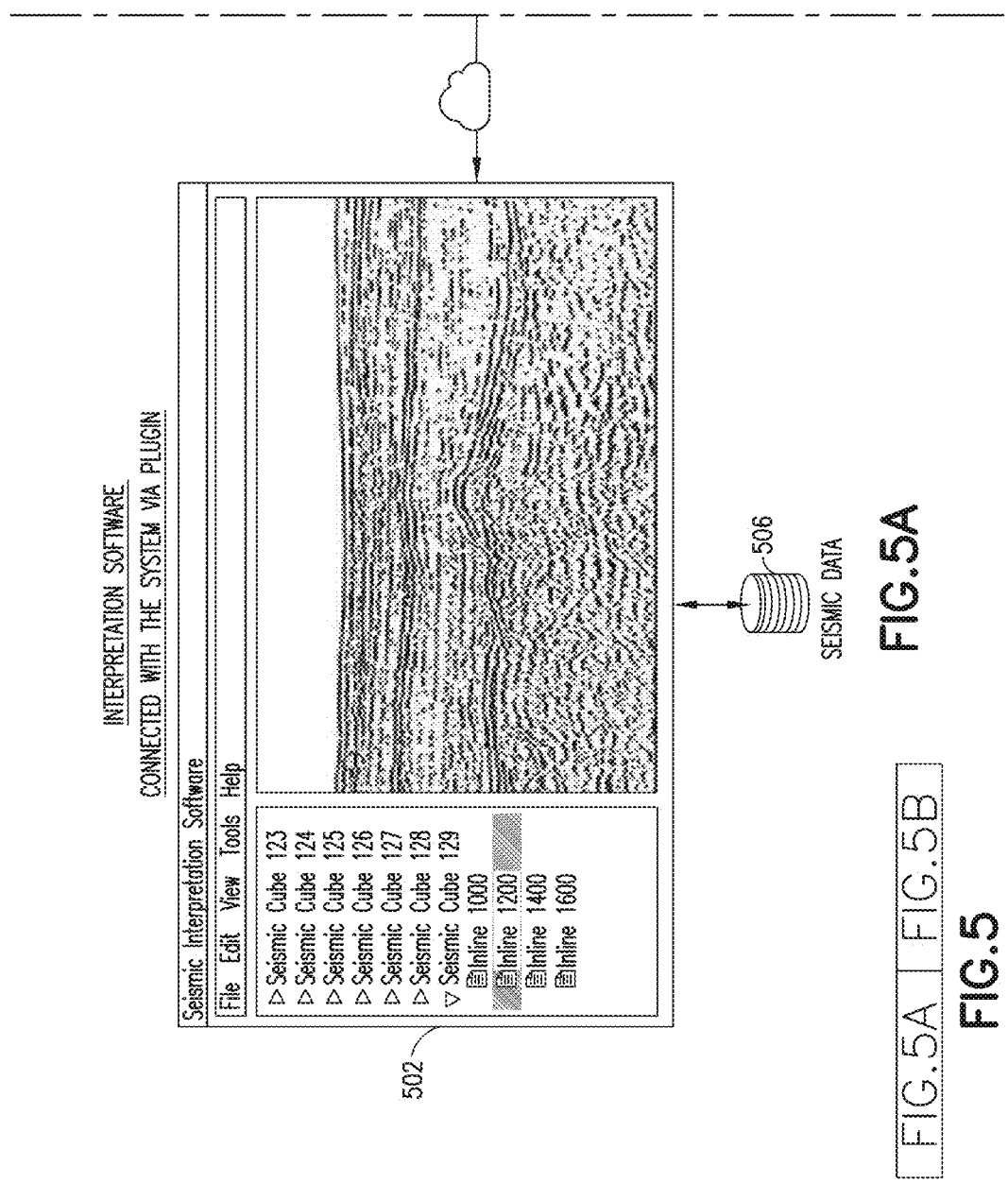

STEERING SEISMIC TEXTURE ANALYSIS ALGORITHMS USING EXPERT INPUT

BACKGROUND

This invention relates generally to identifying seismic textures and, more specifically, relates to the analyzing seismic data to classify seismic textures.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Seismic reflection uses the principles of seismology to estimate the properties of the Earth's subsurface from reflected seismic waves. Seismic reflection terminations and configurations are interpreted as stratification patterns, and are used for recognition and correlation of depositional sequences, interpretation of depositional environment, and estimation of lithofacies. These seismic reflection terminations and configurations help determine the boundary and textures of different seismic layers. Seismic facies are mappable, two or three dimensional seismic units composed of groups of reflections whose parameters differ from those of adjacent facies units. The terms seismic facies and seismic texture are considered synonymous for the sake of this document. Seismic facies analysis includes describing and interpreting seismic reflection parameters, such as configuration, continuity, and frequency. The purpose of seismic facies analysis is to determine all variations of seismic parameters. However, often times the coherence of seismic lines is unclear making it difficult to determine the geological meaning of each seismic layer.

BRIEF SUMMARY

This section is intended to include examples and is not intended to be limiting.

In one exemplary aspect of the embodiments described herein a method is provided, the method comprising: displaying an image on a display; detecting a user input corresponding to one or more portions of the image; analyzing the user input to determine at least one feature vector corresponding to the user input; and determining a classification for the one or more portions of the image based at least on the at least one feature vector.

In one exemplary aspect of the embodiments described herein an apparatus is provided, the apparatus comprising: at least one processor; and at least one non-transitory memory including computer program code, the at least one memory and the computer program code configured to, with the at least one processor, cause the apparatus at least to perform: display an image on a display; detect a user input corresponding to one or more portions of the image; analyze the user input to determine at least one feature vector corresponding to the user input; and determine a classification for the one or more portions of the image based at least on the at least one feature vector.

In one exemplary aspect of the embodiments described herein computer program product for analyzing an image is provided, the computer program product comprising a computer readable storage medium having program instructions embodied therewith, the program instructions executable by a to cause the device to: display the image on a display; detect a user input corresponding to one or more portions of the image; analyze the user input to determine at least one feature vector corresponding to the user input; and determine a classification for the one or more portions of the image based at least on the at least one feature vector.

BRIEF DESCRIPTION OF THE DRAWINGS

In the attached Drawing Figures:

FIGS. 4A-4H illustrate a series of screenshots of an example graphical user interface in accordance with exemplary embodiments;

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for steering seismic texture analysis algorithms using expert input additional description of these techniques is presented after a system into which the exemplary embodiments may be used is described.

Figure 1:
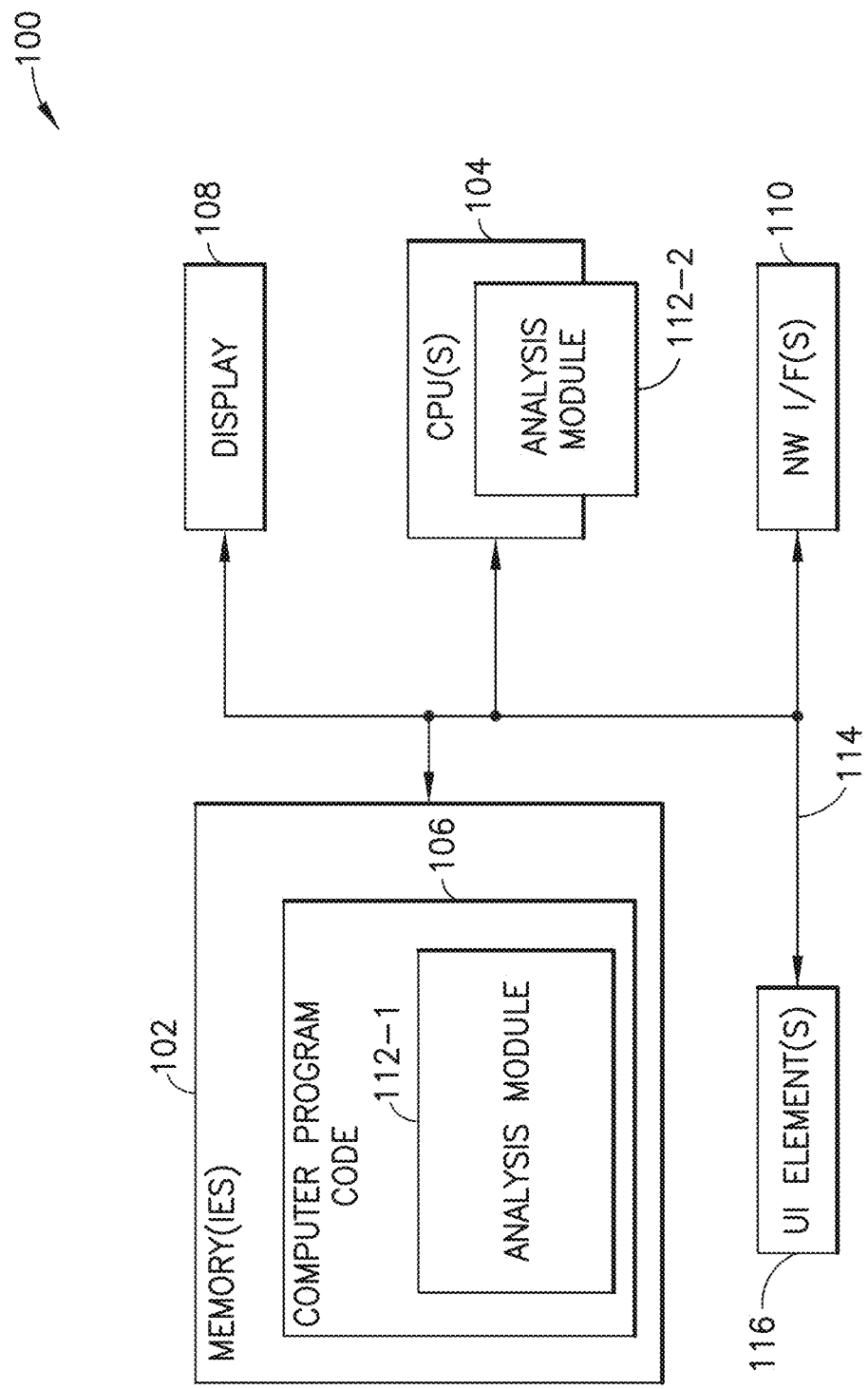
FIG. 1 is a block diagram of one possible and non-limiting exemplary system in which the exemplary embodiments may be practiced.

Referring to FIG. 1, this figure shows a block diagram of one possible and non-limiting system in which the exemplary embodiments may be practiced. In FIG. 1, a device 100 includes one or more processors (shown as CPU(s), central processing units) 104, one or more memories 102, one or more displays 108, and one or more I/O I/F(s) 110 (input/output interfaces) interconnected through one or more buses 114. The one or more processors 104 may be or include one or more hardware accelerators of any kind that helps the one or more processors 104 to process, e.g., one or more video cards, GPUs, ASICs, FPGAs, etc. The one or more buses 114 may be address, data, or control buses, and may include any interconnection mechanism, such as a series of lines on a motherboard or integrated circuit, fiber optics or other optical communication equipment, and the like. The one or more memories 102 include computer program code 106. The device 100 includes an analysis module, comprising parts 112-1 and/or 112-2, which may be implemented in a number of ways. The analysis module may be implemented in hardware as analysis module 112-1, such as being implemented as part of the one or more processors 104. The analysis module 112-1 may be implemented also as an integrated circuit or through other hardware such as a programmable gate array. In another example, the analysis module may be implemented as analysis module 112-2, which is implemented as computer program code 106 and is executed by the one or more processors 104. For instance, the one or more memories 102 and the computer program code 106 may be configured to, with the one or more processors 104, cause the device 100 to perform one or more of the operations as described herein.

Examples of the display(s) 108 may be any commonly known graphical display screen or projector for displaying graphical images. Although illustrated as separate blocks, the display(s) 108 and the user interface (UI) element(s) 116 may be integrated with one another, such as may be the case with a touch screen device. The display(s) 108 may utilize any suitable display technology such as CRT, LED, OLED, Plasma, DLP and the like. The UI elements 116 may include, for instance, one or more of keyboards, mice, trackballs, displays, (e.g., touch screen), a stylus, a smart pen, a gesture detector and the like.

The one or more network interface(s) 110 (NW I/F) may include any suitable interface for transferring information to or from the device 100. Examples of a N/W I/F(s) 110 may include, but are not limited to, USB interfaces; wireless and wired network interfaces, such as Ethernet, NFC, Bluetooth, Wi-Fi, and the like.

The computer readable memory(ies) 102 may be of any type suitable to the local technical environment and may be implemented using any suitable data storage technology, such as semiconductor based memory devices, flash memory, magnetic memory devices and systems, optical memory devices and systems, fixed memory and removable memory. For example, in one embodiment the data storage technology may be nonvolatile memory which does not require a power source to maintain the data, such as flash memory, phase change memory, and resistive memory. The computer readable memories 102 may be means for performing storage functions. The processors 104 may be of any type suitable to the local technical environment, and may include one or more of general purpose computers, special purpose computers, microprocessors, digital signal processors (DSPs) and processors based on a multi-core processor architecture, as non-limiting examples. The processors 104 may be means for performing functions, such as controlling the device 100, and other functions as described herein.

In general, the various embodiments of the device 100 can include, but are not limited to, workstations, servers, personal desktop computers, laptop or tablet computers, and even personal portable digital devices having wireless communication capabilities, including but not limited to handheld or wearable computers such as cellular phones and smart phones, virtual reality headsets or devices.

Although only one exemplary device 100 is shown in FIG. 1, it should be understood that multiple devices may also be used to carry out embodiments described in, such as the case may be in a cloud computing environment for example.

Figure 2:
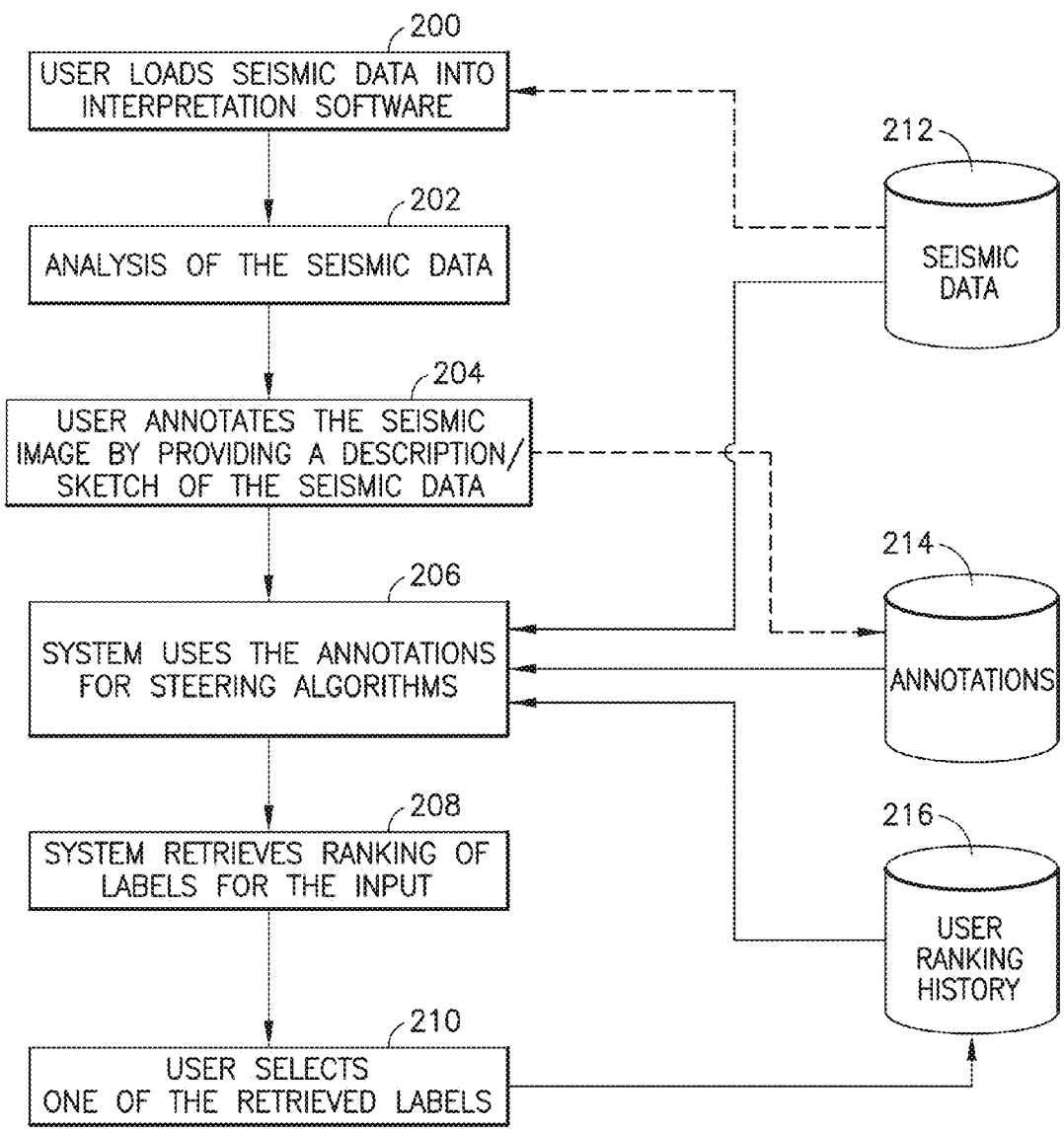
FIG. 2 is a process flow diagram that provides an overview of one example method in accordance with exemplary embodiments.

Referring now to FIG. 2, this figure shows a process flow diagram that provides an overview of an exemplary embodiment. At step 200, the seismic data is loaded into interpretation software by a user. The seismic data may be, for example, a SEG-Y file containing seismic data including reflection terminations and configurations. The seismic data may be stored, for example, in database 212. At step 202, the seismic data is analyzed. The analysis may include performing an image analysis on the seismic image based on the numerical information of the seismic data. For example, the user may perform a visual analysis of the seismic data combining all available information (e.g., geological, geophysical, and petrophysical data) with the user's tacit knowledge (e.g. knowledge about what has happened over millions of years ago). With this information, the user may provide assumptions and the meaning of the layers and facies. At step 204, the user annotates the seismic data, for example, by providing a textual description and/or a sketch input. These annotations are stored in annotation data 214. The interpretation software leverages the user's current annotation data and previously stored annotation data from database 214 for steering algorithms and embedding expert knowledge in the seismic data analysis. At step 208, the interpretation software retrieves a ranking of labels; and at step 210, the user selects one of the retrieved labels. The user's selection is stored in a user ranking database 216. The user ranking database contains, for instance, information related to previous textures the specialist selected over the ones ranked by the system. The stored user ranking data may also be used at step 206, to steer algorithms and consider expert feedback in future seismic texture analysis. Providing this feedback loop of user preferences and user annotations, the algorithms for identifying the seismic textures improve over time.

Figure 3:
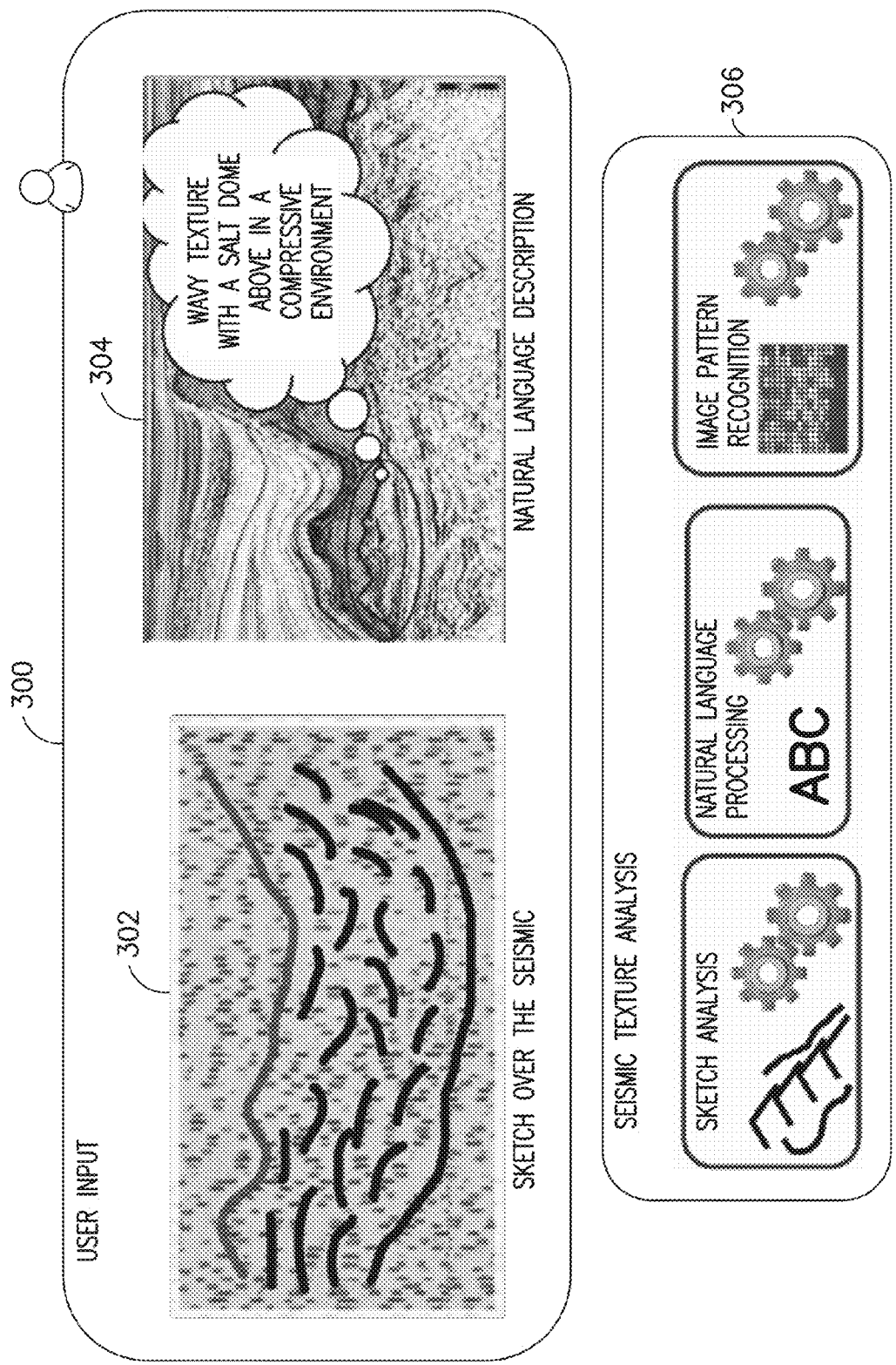
FIG. 3 illustrates an example of user input and corresponding seismic analysis in accordance with exemplary embodiments.

Referring also to FIG. 3, this figure illustrates an example of user input 300 of the seismic image in accordance with exemplary embodiments. According to some embodiments, the user input 300 may include one or both of a sketch input 302 and a natural language description 304. In the example of FIG. 3, both a sketch input 302 and natural language input 304 are shown. The example sketch input 302 includes various lines inputted by the user which form a pattern over the seismic sketch describing the seismic texture. For example, in some embodiments, the user can sketch over the seismic image being presented on a touch screen, a virtual reality environment, or in some embodiments, a mobile device that the expert can accommodate over a table (in conjunction with a stylus-like pen), or even a pointing device as a tablet pad may be utilized. Those skilled in the art will appreciate that the sketch input may be any type of suitable user input, such as one or more of: a touch input, a tap input, a drag input, a gesture input, and a multi-touch input, for example.

The example natural language description 304 shown in FIG. 3 refers to a specific portion of the seismic image, which may be selected by the user according to one of the suitable user inputs described above. In the example shown in FIG. 3, the description corresponding to the selected area states "Wavy texture with a salt dome above in a compressive environment." At 306, the interpretation software analyzes the seismic texture based on the user input 300 and other image pattern recognition algorithms to classify the seismic structures in the seismic image. The various user input can be analyzed and transformed into two feature vectors namely: $f_{SKETCH} \in \mathbb{R}^S$ and $f_{NLP} \in \mathbb{R}^N$, where $f_{SKETCH}$ denotes the feature vector corresponding to the sketch input, and $f_{NLP}$ denotes the user input feature vector corresponding to the natural langue input. Another feature vector may be calculated using computer vision algorithms (such as the pattern recognition algorithms described above), and may be denoted as $f_{CV} \in \mathbb{R}^C$. A final feature vector may then be calculated based on the user input vectors $f_{SKETCH}$ and/or $f_{NLP}$ and the computer vision algorithm vector, $f_{CV}$. Thus, the final feature vector may be calculated as follows:

$$f_{FINAL}=(f_{CV}\oplus f_{SKETCH}\oplus f_{NLP})\in \mathbb{R}^{C+S+N}$$

Some non-limiting techniques for calculating the $f_{CV}$ feature vector include, for example, Level Co-occurrence Matrix (GLCM), Local Binary Pattern (LBP) and Markov Random Fields (MRF). The sketch input may be analyzed and transformed into a set of features such as straight line length, angle, free-form arc length and area between the stroke and straight-line approximation. The natural language descriptions may be analyzed and transformed into a set of features using techniques such as bag of words and word vectors for example. These techniques result in new features that represent the expert knowledge to be embedded in computer vision algorithms, in addition to the features commonly considered in computer vision algorithms.

Figure 4A:
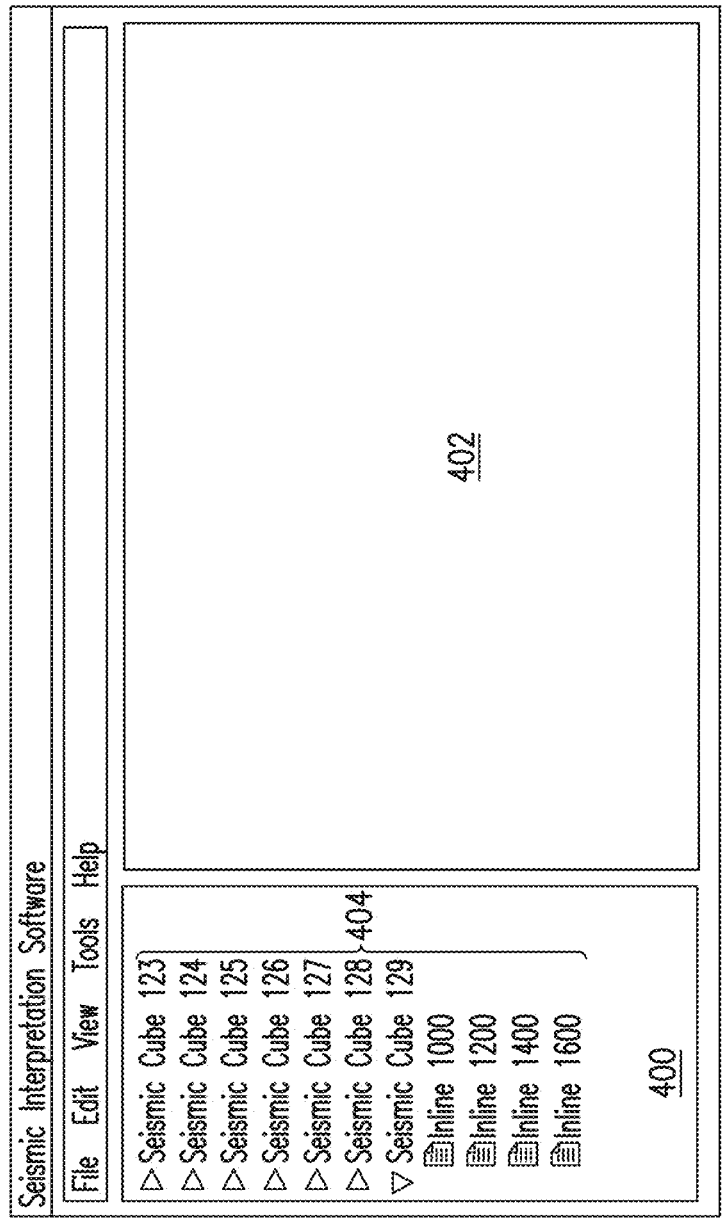
Figure 4B:
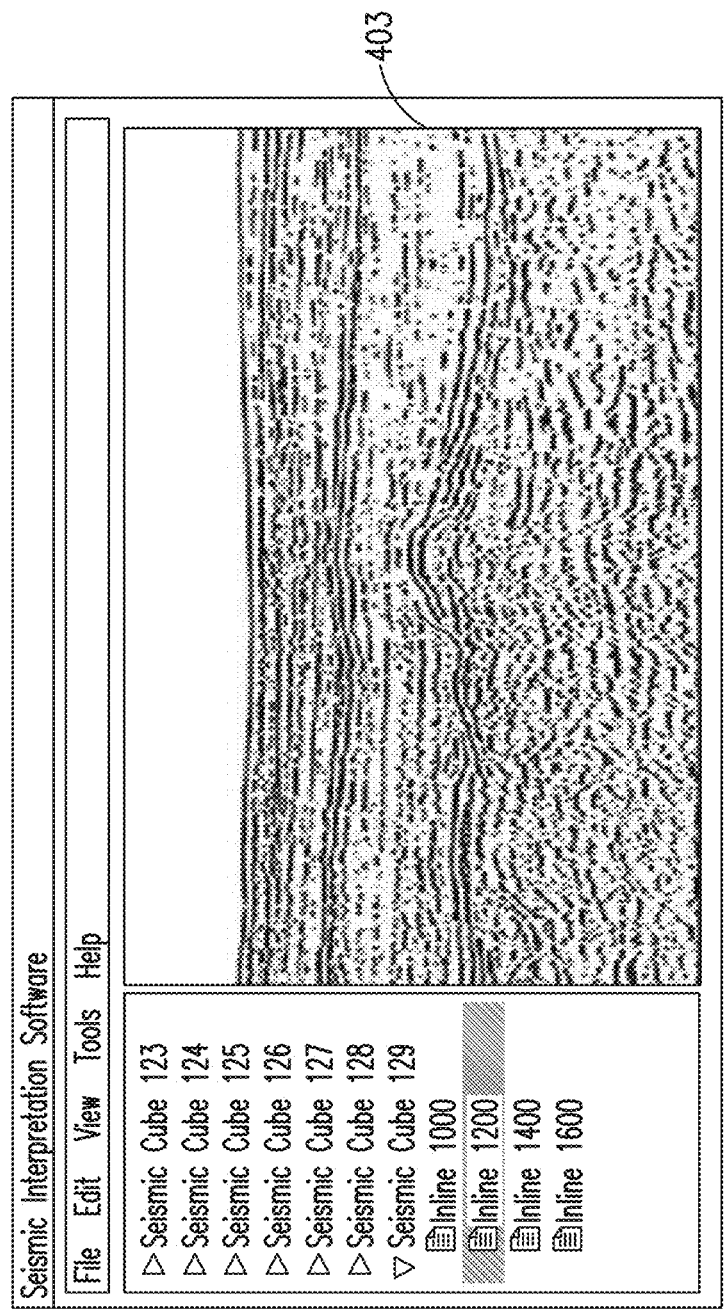
Figure 4C:
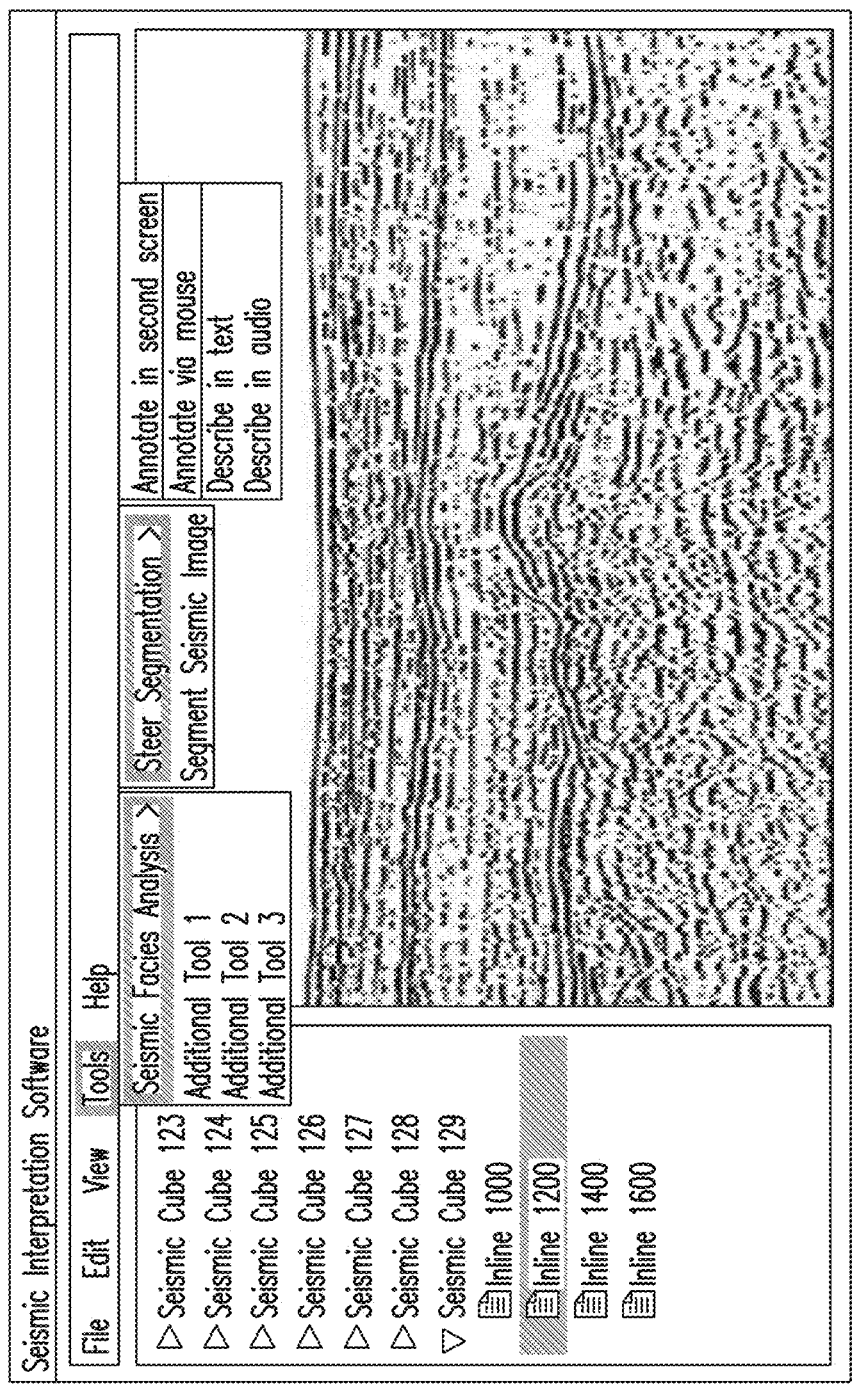
Figure 4D:
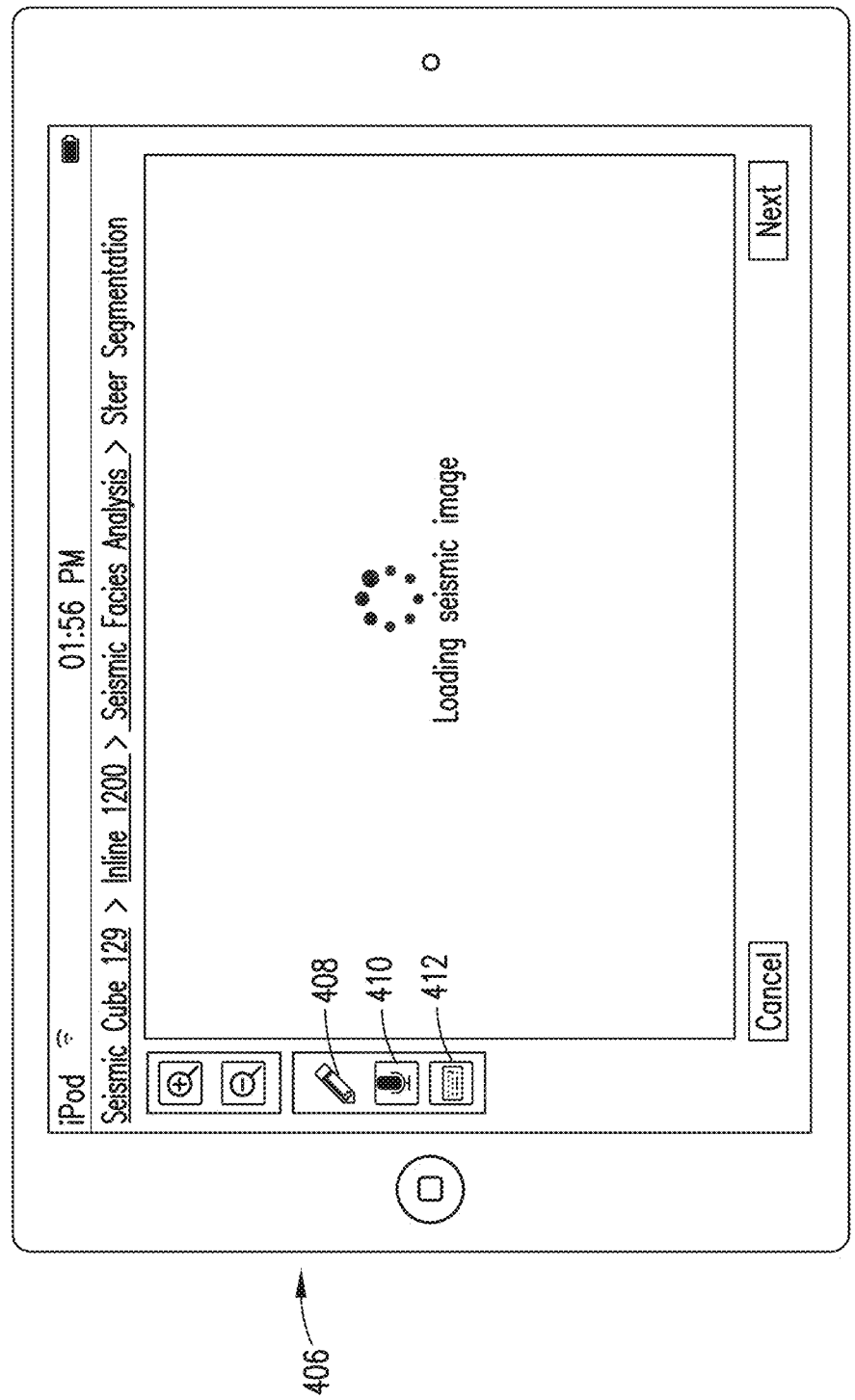
Figure 4E:
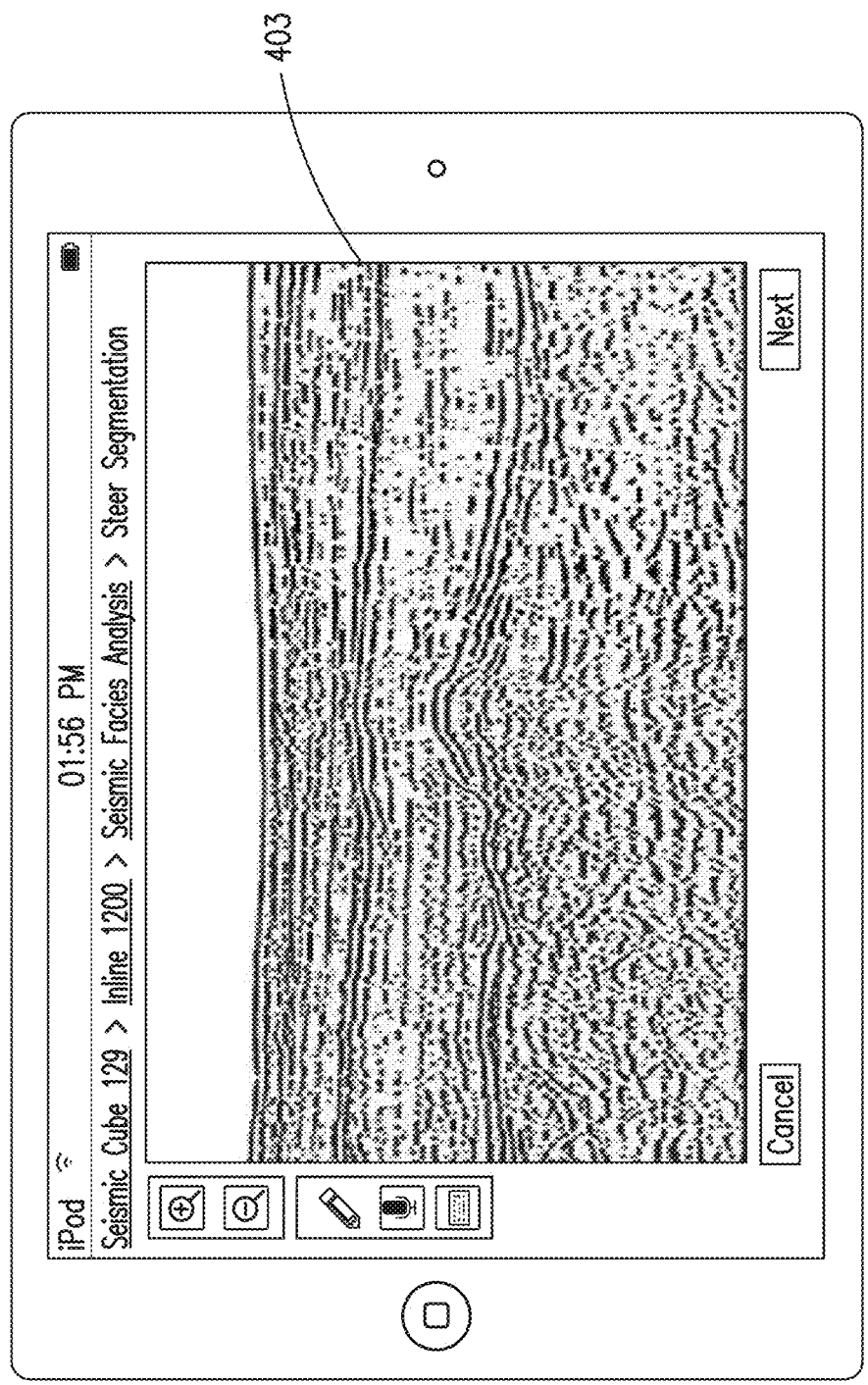
Figure 4F:
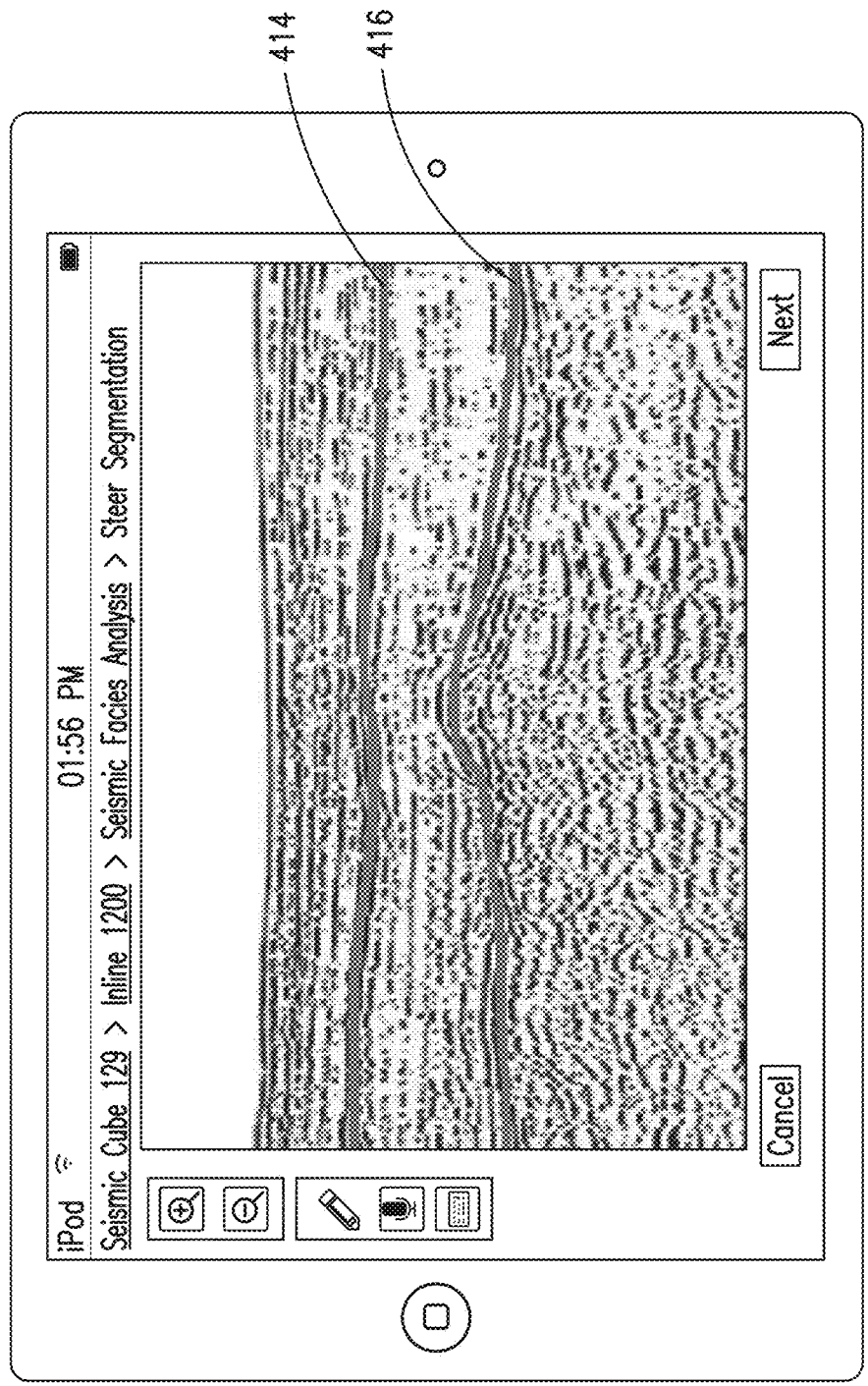
Figure 4G:
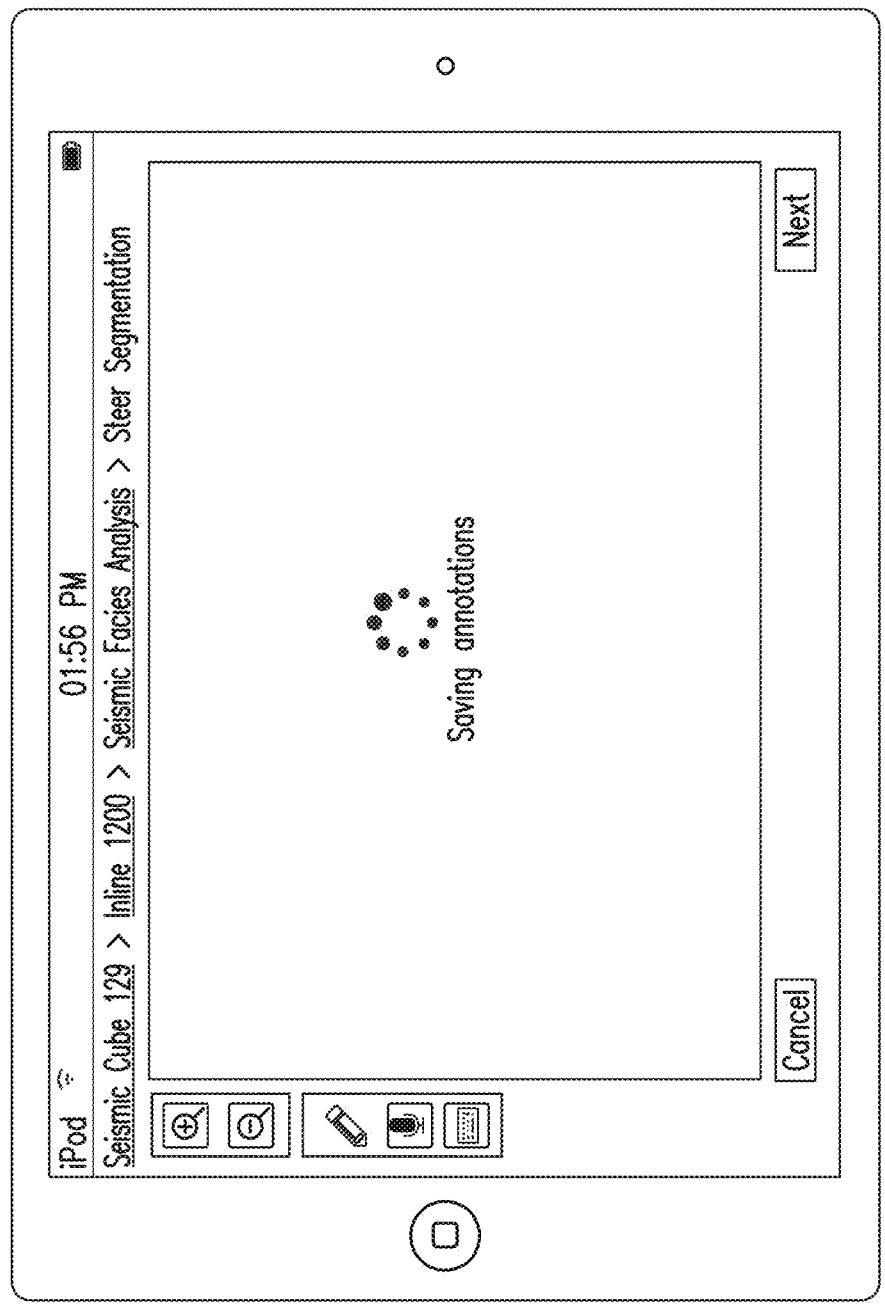

FIGS. 4A-4I illustrate a series of screenshots of a non-limiting example graphical user interface in accordance with exemplary embodiments. In FIG. 4A, a user interface is shown having a selection pane 400, and a viewing pane 402. In this example, the selection pane 400 has a hierarchy 404 of folders and files relating to seismic data. When the user selects one of the seismic data files, a seismic image 403 of the seismic data is displayed in the viewing pane 402, as shown at FIG. 4B. Various tools are available to the user, including a tool to 'steer segmentation' for seismic facies analysis as shown by FIG. 4C. The 'steer segmentation' tool has further options including: 'Annotate in second screen'; 'Annotate via mouse'; 'Describe in text'; and 'Describe in audio'. In this example, the user selects 'Annotate in second screen', and the seismic image 403 corresponding to 'Seismic Cube 129' and 'Inline 1200' is loaded on a different device as shown by FIG. 4D. In this example, the different device is a tablet computer 406 and the user interface is designed to be more suitable for the personal tablet 406. Three tools are available on the left side of user interface in FIG. 4D for providing user input, namely, a sketch tool 408, a microphone tool 410, and a keyboard tool 412. In FIG. 4E, the seismic image 403 has been loaded onto the display of the device 406, and the user selects the sketch tool 408. In FIG. 4F, the user provides user input on the seismic image 403. In this example, the user input is a sketch having two lines over the seismic image 403 which mark certain features of the seismic image 403. The microphone tool 410 may also be used to describe the seismic image 403 simply by verbally describing the seismic image 403. For example, the user may select the microphone tool 410 and say "Wavy texture with a salt dome above in a compressive environment" as shown in FIG. 3. Alternatively, or additionally, the keyboard tool 412 may be used to input a textual description of the seismic image 403 through a virtual or physical keyboard. When the user has finished providing input, e.g. by clicking the 'Next' button, the interpretation software saves the annotations as shown in FIG. 4G. The seismic image 403 is then analyzed and segmented based on, for example, the various user inputs (e.g. natural language description and/or sketch input) and pattern based image algorithms. For example, the seismic image 403 may be analyzed and segmented based on different categories or classifications of the seismic textures identified in the seismic image 403. In the example shown in FIG. 4H, the interpretation software segments the seismic image 403 based on four different seismic classifications, in particular, the four seismic textures 418-424 are output to the user.

Figure 5B:
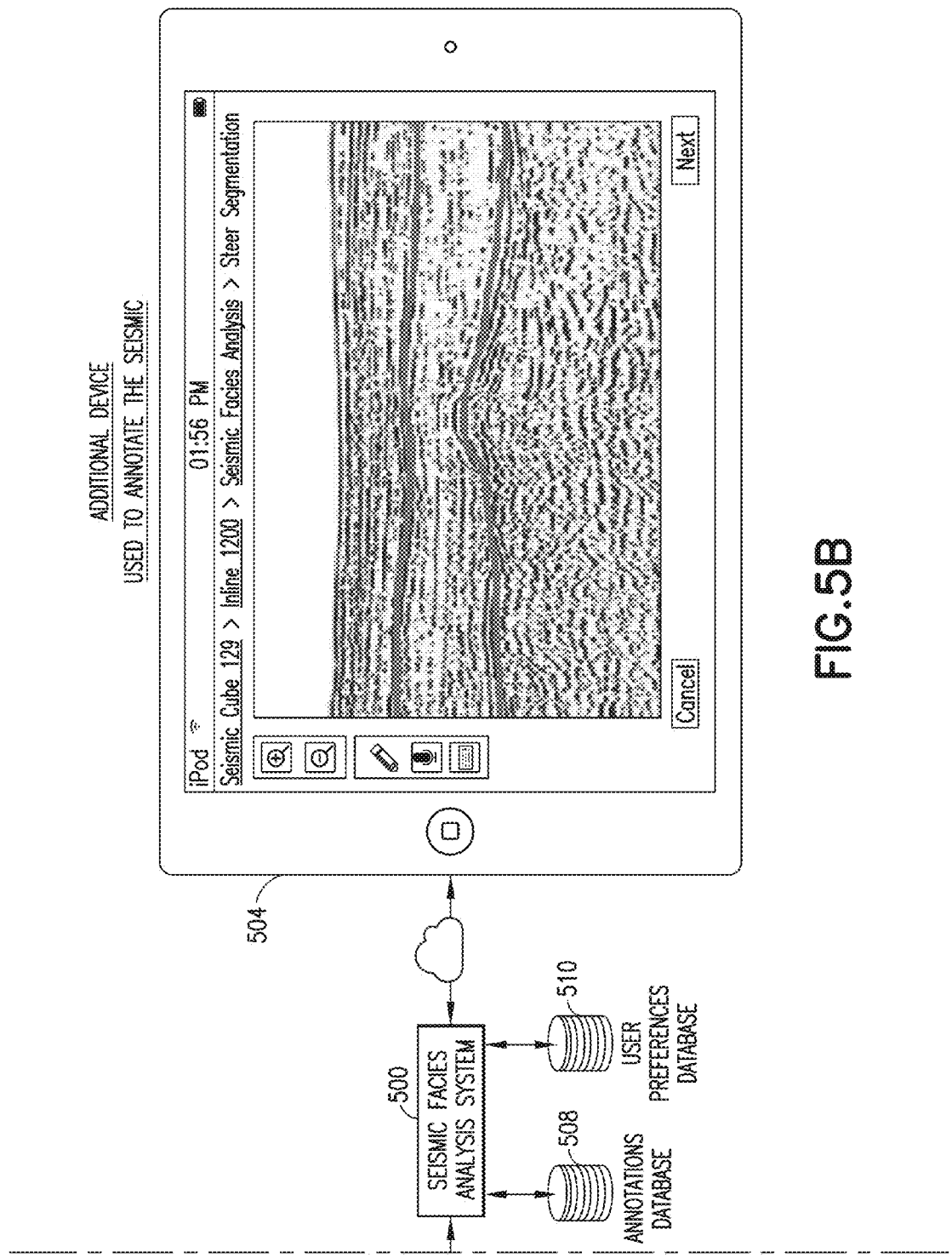
FIG. 5 shows an example system architecture that may be used in accordance with exemplary embodiments.

FIG. 5 shows an example system architecture for a seismic facies analysis system 500. The seismic facies analysis system may be connected to interpretation software 502, for example, through a facies analysis system software plugin. The seismic facies analysis system may also be connected to other devices such as device 504, for example, which are also connected to the system 500 through, e.g., a software plugin. In the example shown in FIG. 5, the interpretation software loads the seismic data from a seismic data database 506, and the additional device is used to annotate the seismic image as described in the embodiments above, for example. The system 500 stores the user annotations and the user preferences in databases 508 and 510. The seismic facies analysis system can leverage the databases 506, 508, and 510 to more accurately segment and identify seismic textures in the seismic image. In some examples, the seismic facies analysis system may be run as a service on the cloud, for example.

The embodiments herein have been described with respect to seismic images and seismic data, but this is not intended to limit the invention. In general, an image or portions of an image may be analyzed to determine certain classifications, categories or characteristics associated with the image or the portions of the image based at least on previously stored input. For example, the techniques described herein are relevant to real-time sensing (including the ones related to IoT—real physical inputs and outputs, e.g. sensors, controls) based on the steering, e.g., guided by the acquired tacit knowledge. Those skilled in the art will appreciate that the embodiments describe herein, are applicable to other domains targeting real-time feedback. For example, doctors could provide user input for images or videos (e.g. medical DICOM images, videos of surgeries) acquired in the field and also link this knowledge into measured numerical data. With such previously stored input, future actions/control could be done automatically or semi-automatically. Other examples include: remote maintenance, industrial sensing/IoT, pipe stress analysis, financial analysis (e.g. real-time decisions in stocks), structure analysis (e.g. CAD, CAM data).

Figure 6:
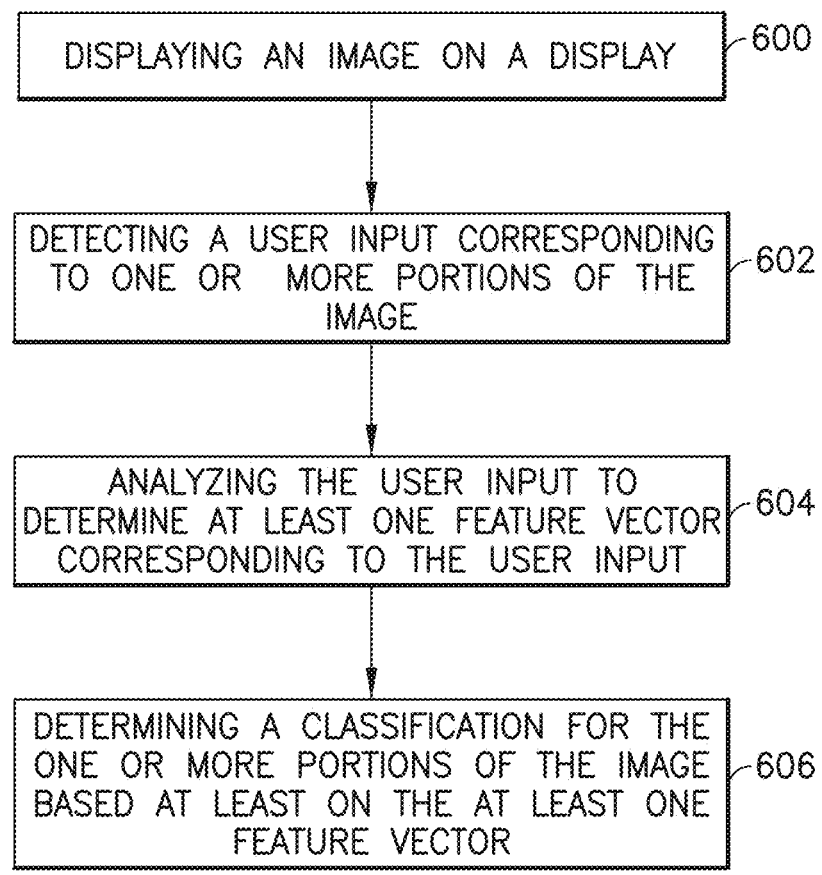
FIG. 6 is a logic flow diagram for steering seismic texture analysis algorithms using expert input, and illustrates the operation of an exemplary method, a result of execution of computer program instructions embodied on a computer readable memory, functions performed by logic implemented in hardware, and/or interconnected means for performing functions in accordance with exemplary embodiments.

FIG. 6 is a logic flow diagram for semantic-based queries using word vector representation. FIG. 6 illustrates the operation of an exemplary method, a result of execution of computer program instructions embodied on a computer readable memory, functions performed by logic implemented in hardware, and/or interconnected means for performing functions in accordance with exemplary embodiments. It is assumed that a device, e.g. device 100 of FIG. 1, performs the blocks in FIG. 6, but the blocks may also be performed in combination with another device.

Referring to FIG. 6, an exemplary method may comprise displaying an image on a display as indicated by block 600; detecting a user input corresponding to one or more portions of the image as indicated by block 602; analyzing the user input to determine at least one feature vector corresponding to the user input as indicated by block 604; and determining a classification for the one or more portions of the image based at least on the at least one feature vector as indicated by block 606.

The user input may include at least one of: at least one sketch input corresponding to one of the portions of the image on the display, and at least one textual description input corresponding to one of the portions of the image on the display; and wherein the at least one feature vector may include a first feature vector for the at least one sketch and/or a second feature vector for the at least one textual description. The determining the classification for the one or more portions of the image may be based at least on the first feature vector and second feature vector. The first feature vector represents a set of features corresponding to at least a portion the at least one sketch. The set of features corresponding to at least the portion of the at least one sketch may be at least one of: a straight line length, an angle, free-form arc length, or an area between a stroke and a straight line approximation. The at least one textual description input may be a natural language description input, and wherein the second feature vector may be determined using at least one of: a bag of words corresponding to the natural language description input, and word vectors corresponding to the natural language description input. The method may further include: displaying labels for the one or more portions of the image based on the determined classification. The method may include storing the user input and the determined classification in a database. The method may include determining a classification for one or more portions of another image based at least on the user input stored in the database. The image may include seismic data, and wherein the determined classification may correspond to a seismic texture of the one or more portions of the image.

An example embodiment may be provided in an apparatus comprising: at least one processor; and at least one non-transitory memory including computer program code, the at least one memory and the computer program code may be configured to, with the at least one processor, cause the apparatus at least to perform: display an image on a display; detect a user input corresponding to one or more portions of the image; analyze the user input to determine at least one feature vector corresponding to the user input; and determine a classification for the one or more portions of the image based at least on the at least one feature vector. The user input may include at least one of: at least one sketch input corresponding to one of the portions of the image on the display, and at least one textual description input corresponding to one of the portions of the image on the display; and wherein the at least one feature vector may include a first feature vector for the at least one sketch and/or a second feature vector for the at least one textual description. The determination of the classification for the one or more portions of the image may be based at least on the first feature vector and second feature vector. The first feature vector may represent a set of features corresponding to at least a portion the at least one sketch. The set of features corresponding to at least the portion of the at least one sketch may include at least one of: a straight line length, an angle, free-form arc length, or an area between a stroke and a straight line approximation. The at least one textual description input may be a natural language description input, and wherein the second feature vector may be determined using at least one of: a bag of words corresponding to the natural language description input, and word vectors corresponding to the natural language description input. The at least one memory and the computer program code may be configured to, with the at least one processor, cause the apparatus at least to: display labels for the one or more portions of the image based on the determined classification. The at least one memory and the computer program code may be configured to, with the at least one processor, cause the apparatus at least to: storing the user input and the determined classification in a database. The at least one memory and the computer program code may be configured to, with the at least one processor, cause the apparatus at least to: determine a classification for one or more portions of another image based at least on the user input stored in the database.

An example embodiment may be provided in a computer program product for analyzing an image, the computer program product may include a computer readable storage medium having program instructions embodied therewith, the program instructions may be executable by a device, to cause the device to: display the image on a display; detect a user input corresponding to one or more portions of the image; analyze the user input to determine at least one feature vector corresponding to the user input; and determine a classification for the one or more portions of the image based at least on the at least one feature vector.

Without in any way limiting the scope, interpretation, or application of the claims appearing below, a technical effect of one or more of the example embodiments disclosed herein is to provide a simple and intuitive interface for experts to describe a texture they want to classify in a seismic image. Another technical effect of one or more of the example embodiments disclosed herein is to better discriminate between seismic textures and improve classification Embodiments described herein augment current texture interpretation methods with user-provided information such as sketches and natural language descriptions of textures. This information provides new features that may be incorporated into the classification algorithms, thus increasing the algorithms ability to discriminate between texture classes. It further provides users a tool to embed the user's knowledge into the seismic texture interpretation process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   displaying an image comprising seismic data on a display of a device;
   detecting, by a processor of the device, user input corresponding to one or more portions of the image, wherein the user input is descriptive of the seismic data;
   causing, by the processor of the device, the image to be analyzed to determine a first feature vector corresponding to the seismic data;
   causing, by the processor of the device, the user input to be analyzed to determine at least one further feature vector corresponding to the user input; and
   determining at least one seismic texture for at least the one or more portions of the image based on the first feature vector and the at least one further feature vector.

2. The method of claim 1, wherein the user input comprises at least one of: at least one sketch input corresponding to one of the portions of the image on the display, and at least one textual description input corresponding to one of the portions of the image on the display; and wherein the at least one further feature vector comprises a second feature vector for the at least one sketch and/or a third feature vector for the at least one textual description.

3. The method of claim 2, wherein determining the at least one seismic texture for the one or more portions of the image is based at least on the second feature vector and the third feature vector.

4. The method of claim 2, wherein:
   the second feature vector represents a set of features corresponding to at least a portion of the at least one sketch.

5. The method of claim 4, wherein the set of features corresponding to at least the portion of the at least one sketch comprises at least one of: a straight line length, an angle, free-form arc length, or an area between a stroke and a straight line approximation.

6. The method of claim 2, wherein the at least one textual description input is a natural language description input, and wherein the third feature vector is determined using at least one of: a bag of words corresponding to the natural language description input, and word vectors corresponding to the natural language description input.

7. The method of claim 1, the method further comprising:
   displaying labels for the one or more portions of the image based on the determined at least one seismic texture.

8. The method of claim 1, the method further comprising:
storing the user input and the determined at least one seismic texture in a database.

9. The method of claim 8, the method further comprising:
determining at least one further seismic texture for one or more portions of another image based at least on the user input stored in the database.

10. An apparatus comprising:
at least one processor; and
at least one non-transitory memory including computer program code, the at least one memory and the computer program code configured to, with the at least one processor, cause the apparatus at least to:
 display an image comprising seismic data on a display of the apparatus;
 detect, by the at least one processor, a user input corresponding to one or more portions of the image;
 cause, by the at least one processor, the image to be analyzed to determine a first feature vector corresponding to the seismic data;
 cause, by the at least one processor, the user input to be analyzed to determine at least one further feature vector corresponding to the user input; and
 determine at least one seismic texture for the one or more portions of the image based at least on the first feature vector and the at least one further feature vector.

11. The apparatus of claim 10, wherein the user input comprises at least one of: at least one sketch input corresponding to one of the portions of the image on the display, and at least one textual description input corresponding to one of the portions of the image on the display; and wherein the at least one further feature vector comprises a second feature vector for the at least one sketch and/or a third feature vector for the at least one textual description.

12. The apparatus of claim 11, wherein determination of the at least one seismic texture for the one or more portions of the image is based at least on the second feature vector and the third feature vector.

13. The apparatus of claim 11, wherein:
the second feature vector represents a set of features corresponding to at least a portion of the at least one sketch.

14. The apparatus of claim 13, wherein the set of features corresponding to at least the portion of the at least one sketch comprises at least one of: a straight line length, an angle, free-form arc length, or an area between a stroke and a straight line approximation.

15. The apparatus of claim 11, wherein the at least one textual description input is a natural language description input, and wherein the third feature vector is determined using at least one of: a bag of words corresponding to the natural language description input, and word vectors corresponding to the natural language description input.

16. The apparatus of claim 10, wherein the at least one memory and the computer program code are configured to, with the at least one processor, cause the apparatus at least to:
 displaying labels for the one or more portions of the image based on the determined at least one seismic texture.

17. The apparatus of claim 10, wherein the at least one memory and the computer program code are configured to, with the at least one processor, cause the apparatus at least to:
 storing the user input and the determined at least one seismic texture in a database.

18. The apparatus of claim 17, wherein the at least one memory and the computer program code are configured to, with the at least one processor, cause the apparatus at least to:
 determine at least one further seismic texture for one or more portions of another image based at least on the user input stored in the database.

19. A computer program product for analyzing an image, the computer program product comprising a computer readable storage medium having program instructions embodied therewith, the program instructions executable by a device to cause the device to:
 display the image on a display, wherein the image comprises seismic data;
 detect, using a processor, a user input corresponding to one or more portions of the image;
 cause, using the processor, the image to be analyzed to determine a first feature vector corresponding to the seismic data;
 cause, using the processor, the user input to be analyzed to determine at least one further feature vector corresponding to the user input; and
 determine, using the processor, at least one seismic texture for at least the one or more portions of the image based on the first feature vector and the at least one further feature vector.

* * * * *